(12) United States Patent
Sillard et al.

(10) Patent No.: US 10,830,946 B2
(45) Date of Patent: Nov. 10, 2020

(54) COUPLED FEW MODE FIBERS, AND CORRESPONDING OPTICAL LINK AND OPTICAL SYSTEM

(71) Applicant: Draka Comteq France, Paron (FR)

(72) Inventors: Pierre Sillard, Paron (FR); Denis Molin, Paron (FR); Marianne Bigot, Paron (FR)

(73) Assignee: Draka Comteq France, Paron (FR)

( * ) Notice: Subject to any disclaimer, the term of this patent is extended or adjusted under 35 U.S.C. 154(b) by 0 days.

(21) Appl. No.: 16/346,263

(22) PCT Filed: Nov. 4, 2016

(86) PCT No.: PCT/IB2016/001696
§ 371 (c)(1),
(2) Date: Apr. 30, 2019

(87) PCT Pub. No.: WO2018/083513
PCT Pub. Date: May 11, 2018

(65) Prior Publication Data
US 2020/0183082 A1 Jun. 11, 2020

(51) Int. Cl.
*G02B 6/028* (2006.01)
*G02B 6/036* (2006.01)

(52) U.S. Cl.
CPC ......... *G02B 6/0288* (2013.01); *G02B 6/0365* (2013.01)

(58) Field of Classification Search
None
See application file for complete search history.

(56) References Cited

U.S. PATENT DOCUMENTS

| 8,705,922 B2 | 4/2014 | Bickham |
| 2015/0168643 A1 | 6/2015 | Gruner-Nielsen et al. |

(Continued)

FOREIGN PATENT DOCUMENTS

| EP | 1101744 A2 | 5/2001 |
| WO | 2011094400 A2 | 8/2011 |

(Continued)

OTHER PUBLICATIONS

International Preliminary Report on Patentability for PCT/IB2016/001696 dated May 7, 2019 (10 pages).

(Continued)

*Primary Examiner* — Chad H Smith
(74) *Attorney, Agent, or Firm* — Shumaker, Loop & Kendrick, LLP

(57) ABSTRACT

An optical fiber having an optical core and an optical cladding surrounding the optical core, the optical core having a single α graded-index profile with α≥1, α being a non-dimensional parameter that defines the index profile shape of the optical core, and the optical core having a maximal refractive index $n_{co}$ at its center; the optical cladding has at its outer edge a refractive index $n_{Cl}$, and comprises a region of depressed refractive index $n_{trench}$, called a trench, with a negative refractive index difference $\Delta n_t = n_{trench} - n_{Cl}$ with respect to said optical cladding, the trench having an outer radius $R_{trench}$. The optical core and cladding are configured to support propagation of at least six spatial modes and at maximum fifty-five spatial modes at an operating wavelength $\lambda_{op}$ between, and including, 1460 nm and 1675 nm, and the optical core satisfies an ovality criterion between 0.05 and 0.3, when said ovality criterion is measured at a circumference of equal index $n_{eq}$ within said core, such that $\Delta n_{eq} = n_{eq} - n_{Cl}$ is less than 75% of $\Delta n_{co} = n_{co} - n_{Cl}$, said ovality criterion o being defined by the following equation:

(Continued)

$$o = \frac{a-b}{a+b}$$

Figure 3:
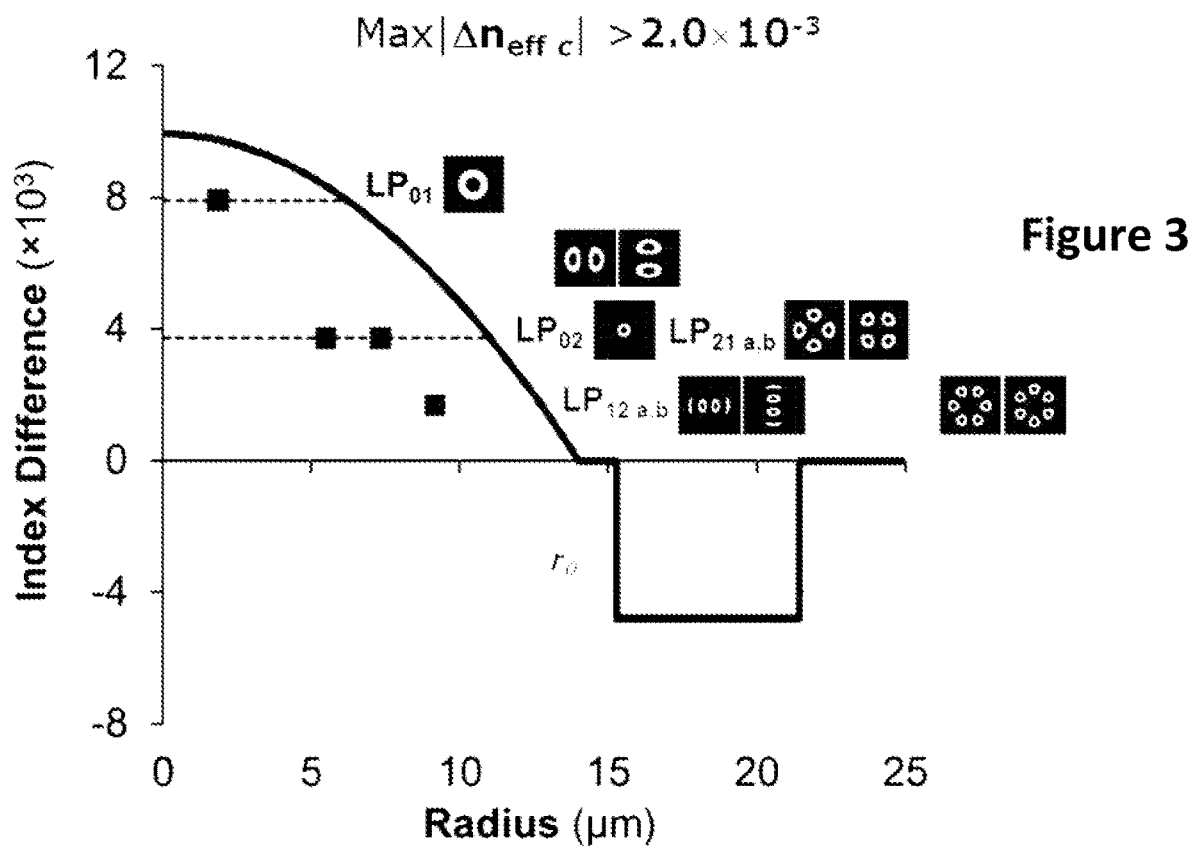

where a is a length of a semi-major axis of said circumference and b is a length of a semi-minor axis of said circumference.

15 Claims, 5 Drawing Sheets

(56) References Cited

U.S. PATENT DOCUMENTS

| | | |
|---|---|---|
| 2016/0223743 A1 | 8/2016 | Sillard et al. |
| 2016/0231503 A1 | 8/2016 | Sillard et al. |
| 2016/0274300 A1 | 9/2016 | Li et al. |

FOREIGN PATENT DOCUMENTS

| | | |
|---|---|---|
| WO | 2015040446 A1 | 3/2015 |
| WO | 2015040447 A1 | 3/2015 |

OTHER PUBLICATIONS

International Search Report (ISR) for PCT/IB2016/001696 dated Jul. 17, 2017 (4 pages).
"Few-mode fibers for space division multiplexing", Pierre Sillard, 2016 Optical Fiber Communications Conference and Exhibition (OFC), OSA, Mar. 20, 2016, XP032942394 (54 pages).
"MIMO DSP Complexity in Mode-Division Multiplexing" Sercan Ö. Arik et al, OFC 2015 (3 pages).
"SDM transmission of real-time 10GbE traffic using commercial SFP + transceivers over 0.5km elliptical-core few mode fiber", Ezra IP et al., Optics Express, pp. 17120-17126, Jun. 2015.
R. Olshansky, Applied Optics, vol. 14(4), Apr. 1975, p. 935-945, 'ModeCoupling Effects in Graded-Index Optical Fibers'.
C. D. Poole "Statistical treatment of polarization dispersion in single-mode fiber", Optics Letters, p. 687-689 (1988).
"Space Division Multiplexing in Optical Fibres" D. J. Richardson, J. M. Fini and L E. Nelson, Nature Photonics vol. 7, pp. 354-362 (2013).

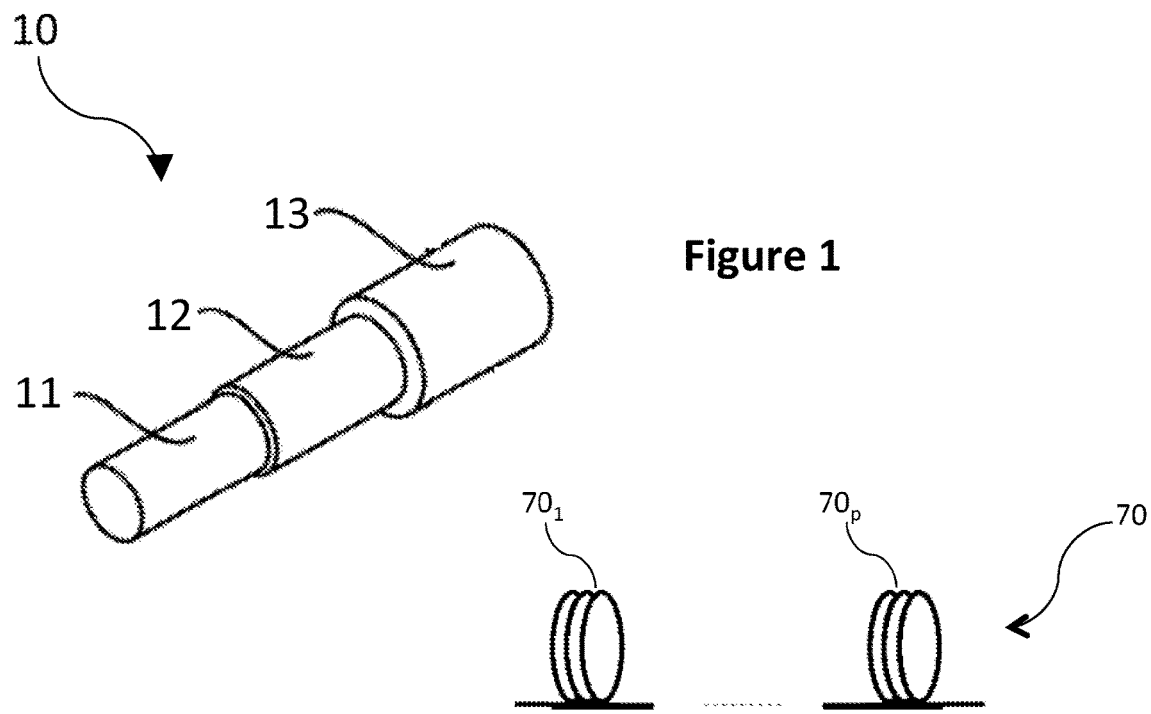
Figure 1
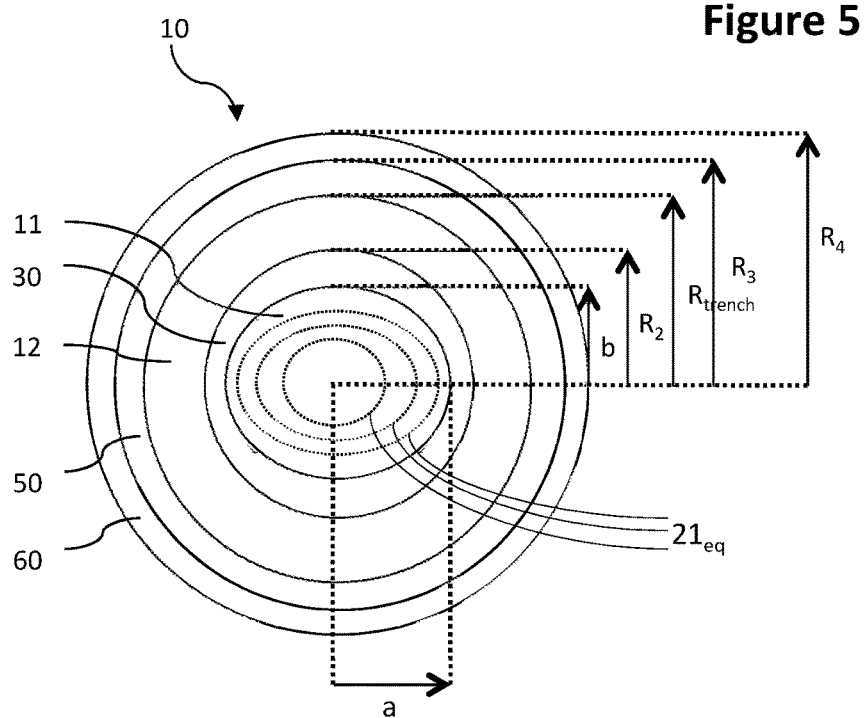
Figure 5
Figure 2

COUPLED FEW MODE FIBERS, AND CORRESPONDING OPTICAL LINK AND OPTICAL SYSTEM

1. FIELD OF THE INVENTION

The invention relates to the field of fiber optic transmission, and, more specifically, to improved few-mode fiber designs for mode division multiplexing (MDM).

2. BACKGROUND

An optical fiber is conventionally constituted of an optical core, which transmits an optical signal, and of an optical cladding, which confines the optical signal within the optical core. To that end the refractive index of the core, $n_{co}$, is greater than the one of the cladding, $n_{Cl}$. An optical fiber is generally characterized by a refractive index profile that associates the refractive index (n) with the radius (r) of the optical fiber: the distance r with respect to the center of the optical fiber is shown on x-axis and the difference Dn between the refractive index at radius r, n(r), and the refractive index of the optical cladding $n_{Cl}$ is shown on y-axis.

Nowadays, two main categories of optical fibers exist: multimode fibers and single-mode fibers. In a multimode fiber, for a given wavelength, several optical modes are propagated simultaneously along the optical fiber, whereas in a single-mode fiber, the higher order modes (hereafter called HOMs) are cut-off or highly attenuated.

Single-mode fibers are commonly used for long-distance applications, such as access networks or metropolitan networks. To obtain an optical fiber capable to transmit a single-mode optical signal, a core with a relatively small diameter is required (typically between 5 µm and 11 µm). To meet requirements of high speed or bit-rate applications (for example ≥10 Gbps), standard single-mode fibers require use of a modulated single-mode laser emitter tuned to work typically at a wavelength of 1550 nm. However, single-mode fibers suffer from non-linearity problems, which are major limitations on fiber transmission capacity.

Multimode fibers are commonly used for short-distance applications requiring a high bandwidth, such as local area networks (LANs), multi-dwelling units (MDUs) and Data Centers (DCs), more generally known as in-building networks. The core of a multimode fiber typically has a diameter of 50 µm, or 62.5 µm. The most prevalent multimode fibers in telecommunications are the refractive graded-index profile optical fibers. By minimizing the intermodal dispersion (i.e. the difference between the propagation delay times or group velocity of the optical modes along the optical fiber, also called DMGD for Differential Mode Group Delay), such a refractive index profile guaranties a high modal bandwidth for a given wavelength, typically 850 nm.

Since data traffic over fiber optic networks continues to grow exponentially, there is an increasing demand for increasing per-fiber traffic particularly across long distances. To this end, multiplexing techniques have been developed that allow a plurality of separate data streams to share the same optical fiber. Among these techniques, one promising approach is space division multiplexing (SDM), in which a plurality of data channels within a single optical fiber are provided by a respective plurality of optical signal modes guided by the fiber.

Such a technique has required the development of new types of optical fibers, called few-mode optical fibers, which support more than one spatial mode but fewer spatial modes than the multi-mode fibers. Such few-mode fibers, which are notably discussed in the PCT patent document WO2011/094400, support approximately 2 to 50 modes.

Space-division-multiplexed transmissions using Few-Mode Fibers (FMFs) have hence recently received considerable attention because of their potential to multiply the capacity of single-mode transmissions by the number of modes that will be used.

One approach to the design of Few-Mode Fibers consists in minimizing the Differential Mode Group Delays (DMGDs, i.e. the difference in the respective arrival times of the guided modes used for spatial multiplexing), so that all modes can be simultaneously detected using complex 2N×2N (N being the total number of spatial modes, i.e. including LP (Linear Polarization) mode degeneracies) MIMO techniques, and that MIMO digital signal processing can efficiently compensate for the deleterious modal crosstalk effects.

A small Group Delay Spread (GDS) can be achieved by minimizing the DMGDs with appropriate fiber designs and with compensating techniques, which consist in combining fibers fabricated to have opposite signs of DGMD. The Few-Mode Fibers thus operate in the so-called weakly-coupled regime, in which the GDS increases linearly with the propagation distance.

Such an approach to FMFs is for example described in patent documents U.S. Pat. No. 8,705,922 and WO 2015/040446.

Although achieving zero crosstalk between propagating modes seems to be theoretically ideal, it appears that mode-coupling is indeed inevitable. Another approach to the use of Few-Mode Fibers thus consists in exploiting them in a strongly-coupled regime. Actually, if the coupling between modes is strong, then the temporal spread will follow a random-walk process and the GDS will scale with the square-root of fiber length. Strong coupling can therefore potentially reduce the computational complexity of MIMO equalizers, and thus allow savings on the cost and power consumption of the network.

Such a behavior of the GDS, which increases with the square root of the propagation distance in case of strong coupling, is highlighted in "MIMO DSP Complexity in Mode-Division Multiplexing" by Sercan Ö. Arik et al., which was presented at OFC 2015. In this article, the authors present a review of existing group delay management techniques and multi-input multi-output (MIMO) Digital Signal Processing (DSP) architectures for mode-division multiplexing systems. They also describe how lumped long fiber Bragg gratings can induce perturbations and impose strong mode coupling to a 6-spatial-mode fiber, and underline that, as a result, the GDS increases with the square root of the propagation distance. According to this prior art technique, mode coupling is introduced thanks to separate fiber grating devices, which must be introduced regularly along the fiber length.

Patent document EP 1 101 744 A2 also addresses the issue of achieving significant mode coupling, but in multimode fibers (MMF), rather than few mode fibers (FMF). The purpose of such a significant mode coupling is to increase the bandwidth of the multimode fiber over short distances. To this end, it is suggested to make multimode fibers with a non-circular core, preferably with chirality introduced during fiber draw. However, a drawback of this technique, as underlined in this patent document, notably through its reference to the article by R. Olshansky (*Applied Optics*, Vol. 14(4), April 1975, p. 935, '*ModeCoupling Effects in*

Graded-Index Optical Fibers'), is that there is a reduction in transmitted power when bandwidth increases through mode coupling. Hence, non-circularity is known to also increase the fiber loss. Such an increase is due to the increase of the (bend) losses of the highest-order guided modes.

Moreover, this prior art patent document only focuses on improving the bandwidth of multimode fibers over short distances, and does not address the issue of achieving a square root behavior of the GDS over long distances in FMFs.

In addition, non-circularity of the fiber core has also been investigated in "*SDM transmission of real-time* 10 *GbE traffic using commercial SFP+transceivers over* 0.5 *km elliptical-core few mode fiber*", Optics Express, pp. 17120-17126, June 2015, but with the opposite goal of decreasing the mode coupling of spatial modes within the same mode group in a FMF. More precisely, this document describes a FMF with only 2 LP modes (namely 3 spatial modes at 1300 nm and 2 spatial modes at 1500 nm), which has an elliptical core with an ovality of 0.20, where the ovality is defined as $$o = \frac{a-b}{a+b}$$

where a and b are the radius of the long and short axes of the ellipse, respectively. The purpose of such an ovality of the fiber core is to break the degeneracy of the $LP_{11a}$ and $LP_{11b}$ modes belonging to the same mode group, so that they can transmit information independently and that no MIMO is used at reception. The fiber thus transmits less spatial modes, which contradicts the increasing need for increasing per-fiber traffic across long distances.

As a conclusion, although it is known that mode coupling (intragroup and intergroup) reduces the linear dependency of GDS, and hence the computational complexity of MIMO equalizers, there is still a need for an adequate technique for achieving a strong intragroup and intergroup mode coupling of the propagating modes in a Few Mode Fiber.

3. SUMMARY

In an embodiment of the present disclosure, an optical fiber is disclosed which comprises an optical core and an optical cladding surrounding the optical core, the optical core having an α graded-index profile with α≥1, α being a non-dimensional parameter that defines the index profile shape of the optical core, and the optical core having a maximal refractive index $n_{co}$ at its center; the optical cladding has at its outer edge a refractive index $n_{Cl}$, and comprises a region of depressed refractive index $n_{trench}$, called a trench, with a negative refractive index difference $\Delta n_t = n_{trench} - n_{Cl}$ with respect to the optical cladding, the trench having an outer radius $R_{trench}$.

The optical core and the optical cladding are configured to support propagation of at least six spatial modes and at maximum fifty-five spatial modes at an operating wavelength $\lambda_{op}$ between, and including, 1460 nm and 1675 nm. Moreover, the optical core satisfies an ovality criterion between 0.05 and 0.3, when the ovality criterion is measured at a circumference of equal index $n_{eq}$ within the core, such that $\Delta n_{eq} = n_{eq} - n_{Cl}$ is less than 75% of $\Delta n_{co} = n_{co} - n_{Cl}$, the ovality criterion o being defined by the following equation:

$$o = \frac{a-b}{a+b}$$

where a is a length of a semi-major axis of said circumference and b is a length of a semi-minor axis of said circumference.

Hence, such a FMF optical fiber has a core ovality, which allows reducing the effective index differences between the propagating spatial modes, thereby forcing their coupling and imposing a square root behavior of the Group Delay Spread with the propagation distance. Such a core ovality is measured at a region of equal index in the core, which corresponds to less than 75% of the maximum refractive index difference between the core and the cladding, and not necessarily at the core-cladding interface, as was often described in prior art solutions.

Such a core ovality is evaluated by an ovality criterion which may reach values as high as 0.3, thus strongly increasing the mode mixing between the at most 10 mode groups (i.e. 55 spatial modes) propagating in the optical fiber. To compensate for the strong increase in fiber loss induced by this strong mode coupling, the cladding of such a fiber is designed with an embedded depressed trench, which leads to decrease the macrobending losses by improving the confinement of the optical modes within the core. Preferably the ovality criterion is between 0.10 and 0.30, more preferably between 0.15 and 0.30.

The optical core of such a fiber shows an α graded-index profile, which commonly designates an optical core having a refractive index profile n(r) defined as follows:

$$n(r) = n_0 \sqrt{1 - 2\Delta\left(\frac{r}{r_0}\right)^\alpha}, r \le r_0$$

where:
r is a variable representative of the radius of the optical fiber,
$r_0$ is the optical core outer radius,
Δ is the normalized refractive index difference, with $$\Delta = \frac{n_{co}^2 - n_1^2}{2n_{co}^2}$$

$n_1$ is the minimal refractive index of the optical core,
$n_{co}$ is the maximal refractive index of the optical core,
α is a non-dimensional parameter that defines the index profile shape of the optical core.

An alpha parameter α=2 corresponds to an inverted parabola. An alpha parameter α=1 corresponds to a triangular shape, while an alpha parameter α=∞ corresponds to a step function.

Such a definition is well suited for a circular core, but must of course be adapted for an elliptical core, for which the refractive index will vary differently as a function of the distance to the core center, along the major (or longer) a and minor (or shorter) b axis of the ellipse. Notably, the alpha parameter may have different values along both axis of the elliptical circumference of the core.

Thanks to the square root behavior of the Group Delay Spread as a function of the propagation distance along this optical fiber, less mode delays are introduced at reception as compared to prior art solutions, and the computational complexity of MIMO equalizers can be reduced, which also yields more efficient crosstalk compensation.

According to an embodiment of the present disclosure, the ovality criterion of the optical core varies as a function of a distance to the optical core center.

Actually, the purpose of designing an elliptical core is to decrease the effective index differences between the guided modes, so as to induce their coupling. Yet, the impact of ovality on the fundamental modes on the one hand, and on the highest-order modes on the other hand, is quite different, and a varying ovality within the core may allow adapting to the specific features of the spatial modes propagating in the fiber.

According to a further embodiment of the present disclosure, the ovality criterion of the optical core increases from a first low ovality value measured at a circumference of equal index $n'_{eq}$ within said core, such that $\Delta n'_{eq}=n'_{eq}-n_{Cl}$ is more than 75% of $\Delta n_{co}=n_{co}-n_{Cl}$, to an optimum ovality value measured at said circumference of equal index $n_{eq}$ within said core, such that $\Delta n_{eq}=n_{eq}-n_{Cl}$ is less than 75% of $\Delta n_{co}=n_{co}-n_{Cl}$, and the ovality criterion of the optical core decreases from the optimum ovality value to a second low ovality value measured at a core-cladding interface.

Hence, the first low ovality value corresponds to a more circular core at the center of the fiber, where a high ovality criterion cannot really decrease the effective index differences between the $LP_{01}$ and $LP_{11}$ mode groups, while small ovality values at the core center are easier to manufacture. The second low ovality value also corresponds to a more circular circumference of the core, at the core-cladding interface, where small values of the ovality criterion are sufficient to reduce the differences of effective indexes between the highest order modes.

The ovality profile of the fiber according to this embodiment thus increases with the distance to the core center, from a first low value to an optimum value, chosen to induce strong mode coupling between the propagating modes, and then decreases down to the core-cladding interface.

Preferably, the optimum ovality value is between 0.1 and 0.3, more preferably between 0.15 and 0.3, while the first and second low ovality values are less than circa 0.05. The first and second low ovality values may or not be equal. The second low ovality value may be equal to zero, corresponding to a circular outer circumference of the core. It must be noted that it is not possible to define the value of the ovality criterion at the core center.

According to an embodiment, the optical core and the optical cladding are configured such that:
- a length a of a semi-major axis of an outer circumference of said optical core is between 13.5 μm and 27 μm;
- said trench outer radius $R_{trench}$ is between 20 μm and 42 μm;
- said trench negative refractive index difference $\Delta n_t=n_{trench}-n_{Cl}$ is between $-15\times10^{-3}$ and $-5\times10^{-3}$ at said operating wavelength $\lambda_{op}$; and $$7.8 \le \frac{2\cdot\pi\cdot a}{\lambda_{op}}\sqrt{n_{co}^2-n_{cl}^2} \le 23,$$

parameter corresponding to the normalized frequency V of the fiber.

In case the outer circumference of the optical core is circular, it is the radius $r_0$ of the core, which is between 13.5 μm and 27 μm.

Such a design of the optical fiber core and cladding allow the fiber to support between 6 and 55 spatial modes at the operating wavelength $\lambda_{op}$. Such an operating wavelength is preferably in the C-(1530-1570 nm) or L-(1570-1625 nm) bands, but can be chosen between 1460 and 1675 nm, which corresponds to the usual operating wavelengths of Few Mode Fibers.

According to an embodiment, the non-dimensional parameter α has a value between 1 and 3. Actually, the constraints on the value of alpha are not as important as when designing FMF fibers intended to operate in the weakly-coupled regime, for which alpha should be chosen close to 2.

According to an embodiment, a maximum Max|Δ$n_{\it{eff\,o}}$| of effective index differences between any two subsequent spatial modes propagating in said optical core except $LP_{01}$, $LP_{11a}$ and $LP_{11b}$ spatial modes, is such that Max|Δ$n_{\it{eff\,o}}$|≤1.0×10$^{-3}$. Hence, a strong mode coupling is achieved between the spatial modes, except for the first three spatial modes $LP_{01}$, $LP_{11a}$ and $LP_{11b}$.

According to a further embodiment, a maximum Max|Δ$n_{\it{eff\,o}}$| of effective index differences between any two subsequent spatial modes propagating in said optical core, except $LP_{01}$, $LP_{11a}$ and $LP_{11b}$ spatial modes, is such that Max|Δ$n_{\it{eff\,o}}$|≤0.8×10$^{-3}$.

According to a further embodiment, a maximum Max|Δ$n_{\it{eff\,o}}$| of effective index differences between any two subsequent spatial modes propagating in said optical core, except $LP_{01}$, $LP_{11a}$ and $LP_{11b}$ spatial modes, is such that $$\text{Max}|\Delta n_{\it{eff\,o}}| \le 2\cdot\frac{\sqrt{2\Delta}}{r_0\times k\times(M+1)},$$

where:

$$\Delta = \frac{n_{co}^2-n_{Cl}^2}{2n_{co}^2}$$

is a normalized core cladding refractive index difference, $$k = \frac{2\pi}{\lambda_{op}},$$

and

M is a number of mode groups which would propagate in said optical core if said optical core were circular and did not satisfy any non-zero ovality criterion.

According to yet a further embodiment, a maximum Max|Δ$n_{\it{eff\,o}}$| of effective index differences between any two subsequent spatial modes propagating in said optical core, except $LP_{01}$, $LP_{11}a$ and $LP_{11b}$ spatial modes, is such that $$\text{Max}|\Delta n_{\it{eff\,o}}| \le 2\cdot\frac{\text{Max}|\Delta n_{\it{eff\,c}}|}{(M+1)},$$

where Max|Δ$n_{\it{eff\,c}}$| is a maximum of effective index differences between any two subsequent spatial mode groups which would propagate in said optical core if said optical core were circular and did not satisfy any non-zero ovality criterion.

According to an embodiment, such an optical fiber has a chirality of at least 1 turn/meter. Actually, it can also further enhance coupling between the degenerate spatial modes of the FMFs with slightly elliptical cores.

Another aspect of the disclosure concerns an optical link comprising at least one optical fiber as described here above in any of its embodiments.

Such an optical link may comprise any number of concatenated optical fibers, as long as one of them at least complies with the features set forth in the present disclosure. Such an optical link may also comprise several optical fibers, which would all comply with the features of the present disclosure.

According to an embodiment, an optical link is provided, which comprises N optical fibers according to embodiments of the present disclosure, with N≥2, N being an integer. At least two optical fibers in the link have $DMGD_i$ showing opposite signs for at least the $LP_{11}$ mode guided by the optical fibers, where $DMGD_i$ is the Differential Mode Group Delay between the $LP_{11}$ mode and the fundamental $LP_{01}$ mode in optical fiber i.

Actually, ovality of the core may not be sufficient for the mixing between $LP_{01}$ and $LP_{11}$, and between $LP_{11}$ and the other modes, to be as strong as that between the other spatial modes. Thus, it might not yield a fully strongly-coupled regime within the optical fiber. Concatenating elliptical core fibers of appropriate lengths with positive and negative DMGDs for the $LP_{11}$ modes is a way to further reduce the Group Delay Spread of the optical fiber according to embodiments of the present disclosure.

More generally, according to an embodiment, an optical link is provided which comprises optical fibers having DMGDs showing opposite signs, not only for the $LP_{11}$ modes, but for a part or all their higher-order LP modes guided in the fiber, for which such a concatenation may also be beneficial to reduce DMGD of the link.

Such an optical link comprises N optical fibers, with N≥2, N being an integer. At least two optical fibers in the link have $DMGD_{i,LP_{xy}}$ showing opposite signs for at least two $LP_{xy}$ modes guided by the optical fibers, where $DMGD_{i,LP_{xy}}$ is the Differential Mode Group Delay between the $LP_{xy}$ mode and the fundamental $LP_{01}$ mode in optical fiber i, with x belonging to $\{0, 1, 2, \ldots\}$ and y belonging to $\{1, 2, \ldots\}$.

According to an embodiment, $Max|DMGD_{link}|_{LP_{11}} \leq 50$ ps/km, where $Max|DMGD_{link}|_{LP_{11}}$ is the absolute maximum value of Differential Mode Group Delay between said $LP_{11}$ mode and the fundamental $LP_{01}$ mode in said optical link.

The present disclosure also concerns an optical system comprising at least one optical fiber or at least one optical link according to embodiments of the present disclosure.

4. BRIEF DESCRIPTION OF THE DRAWINGS

Figure 4:
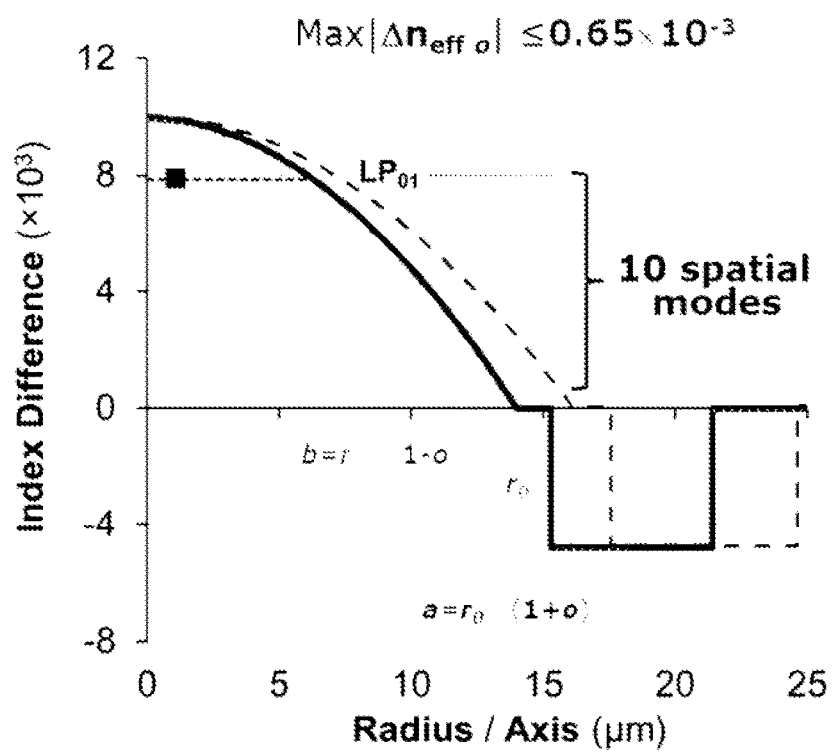
Figure 6:
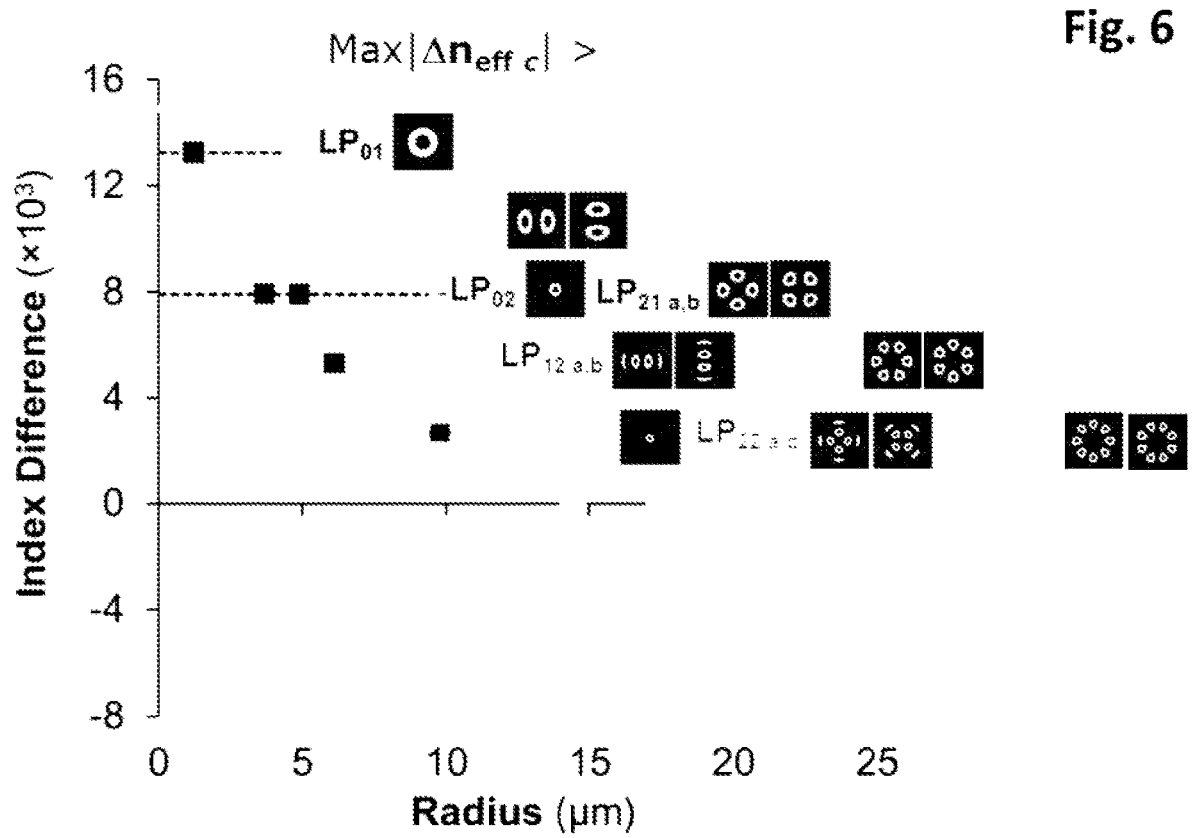
Figure 7:
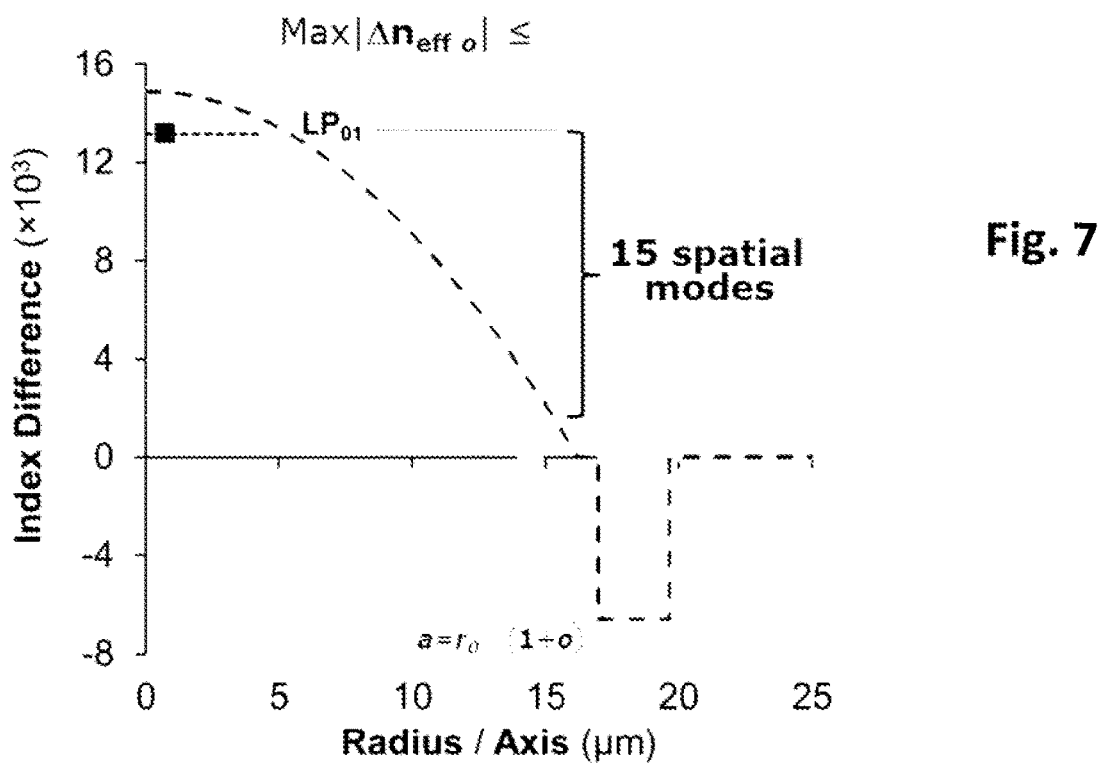
Figure 8:
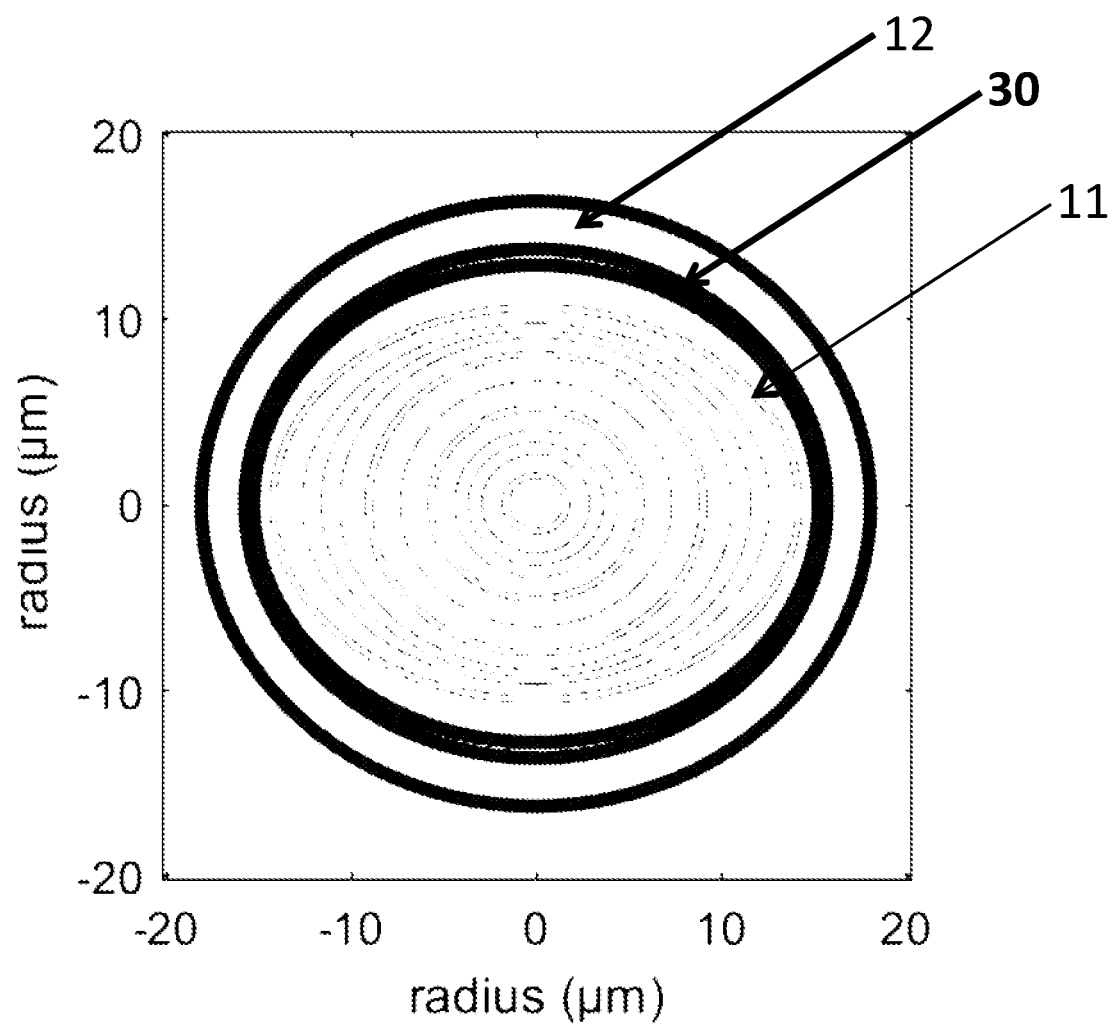
Figure 9A:
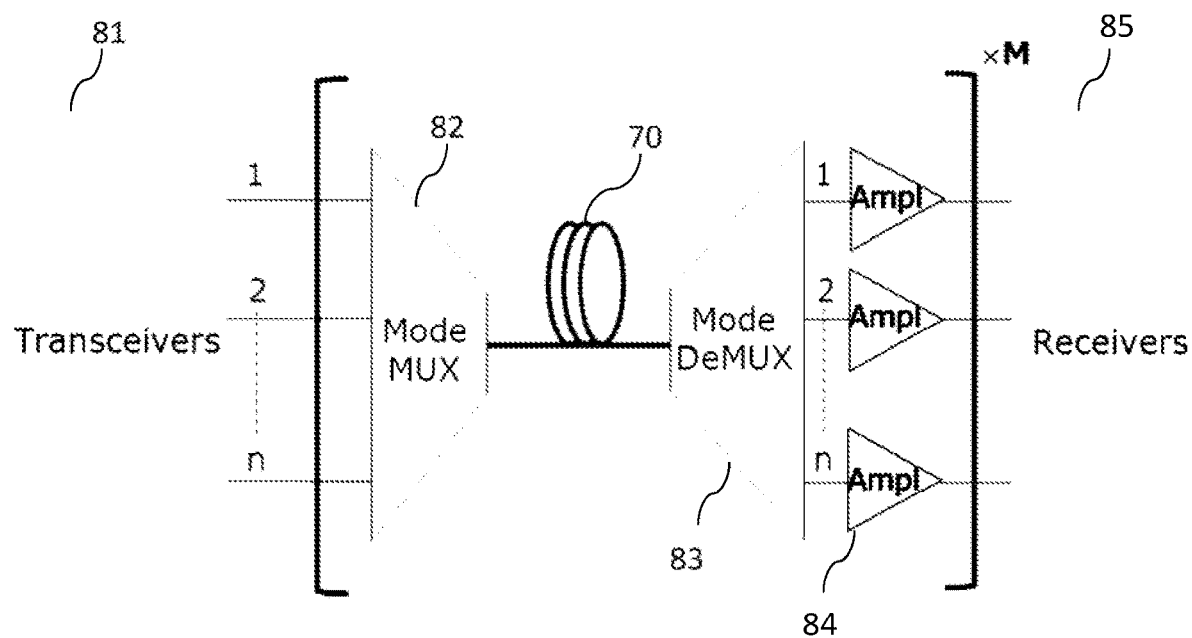
Figure 9B:
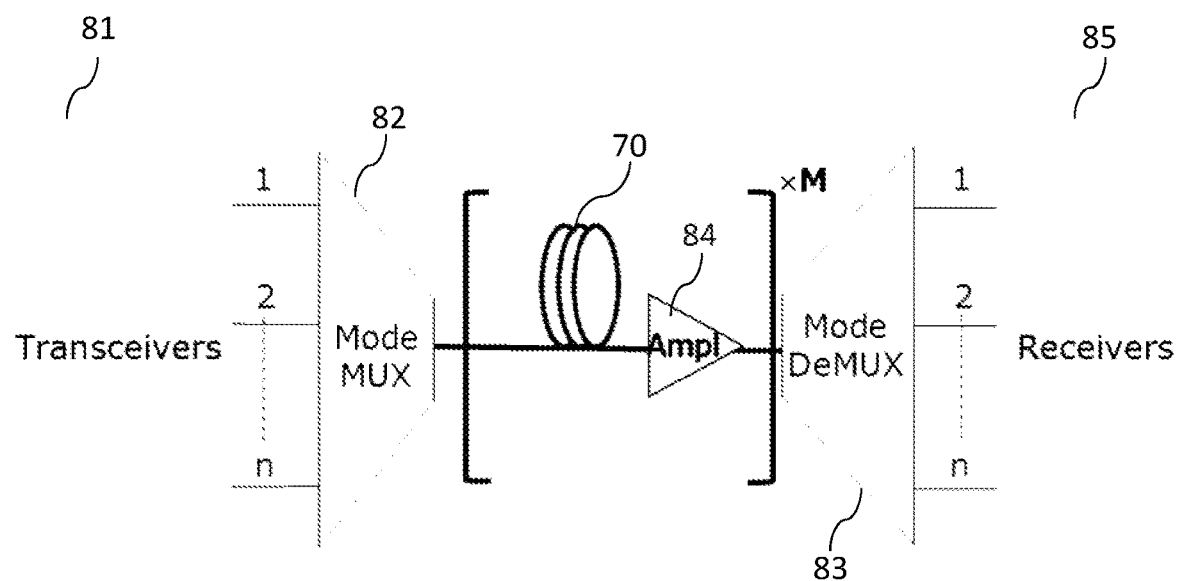

The present disclosure can be better understood with reference to the following description and drawings, given by way of example and not limiting the scope of protection, and in which:

FIG. 1 schematically depicts an isometric view of an exemplary FMF optical fiber according to one or more embodiments described herein;

FIG. 2 schematically depicts a cross section of an optical fiber according to one or more embodiments described herein;

FIG. 3 graphically provides the refractive index profile of a first prior art circularly symmetric FMF optical fiber;

FIG. 4 graphically provides the refractive index profile of a FMF optical fiber according to a first embodiment of the present disclosure, corresponding to the FMF of FIG. 3 with a constant core ovality of 0.15;

FIG. 5 illustrates an optical link according to an embodiment of the present disclosure;

FIG. 6 graphically provides the refractive index profile of a second prior art circularly symmetric FMF optical fiber;

FIG. 7 graphically provides the refractive index profile of a FMF optical fiber according to a second embodiment of the present disclosure, corresponding to the FMF of FIG. 6 with a constant core ovality of 0.15;

FIG. 8 schematically depicts a cross section of an optical fiber with changing ovality according to an embodiment of the present disclosure;

FIGS. 9A and 9B illustrate embodiments of an optical system according to the present disclosure.

The components in the figures are not necessarily to scale, emphasis instead being placed upon illustrating the principles of the invention.

5. DETAILED DESCRIPTION

The general principle of the present disclosure relies on the design of a new Few Mode Fiber with strong intragroup and intergroup mode coupling of the propagating modes, in order to reduce the linear dependency of the Group Delay Spread, and thus to decrease the computational complexity of MIMO equalizers at reception. Such a strong coupling is achieved by introducing some ovality in the core of the optical fiber.

Reference will now be made in detail to embodiments of few-mode optical fibers, examples of which are illustrated in the accompanying drawings. Whenever possible, the same reference numerals will be used throughout the drawings to refer to the same or like parts.

One embodiment of a few-mode optical fiber according to the present disclosure is schematically depicted in isometric view in FIG. 1. The optical fiber 10 generally has a glass core 11 surrounded by a glass cladding. More precisely, the optical fiber 10 comprises three abutting concentric regions, namely:

a graded-index core 11;
a trench 12, with an outer radius $R_{trench}$;
an outer cladding 13, with a refractive index $n_{Cl}$.

In embodiments of the present disclosure, the glass core 11 may have an elliptical outer circumference, with a semi-major, or longer, axis of length a and a semi-minor, or shorter, axis of length b, as will be explained hereafter in greater details. An ovality criterion o is defined as:

$$o = \frac{a-b}{a+b}$$

The glass core 11 may be associated with a radius $r_0$, such that $a=r_0(1+o)$ and $b=r_0(1-o)$, which is between 13.5 μm and 27 μm. Moreover, the trench has an outer radius $R_{trench}$ between 20 μm and 42 μm. The trench 12 may be directly abutting the optical core, or not. In the embodiments shown and described herein, the core 11 and the cladding 13 generally comprise silica, specifically silica glass. In some embodiments described herein, the radius $R_3$ (i.e. the radius of the glass portion of the optical fiber 10) is about 62.5 μm. However, it should be understood that the dimensions of the cladding may be adjusted such that the radius $R_3$ may be greater than or less than 62.5 μm. The optical fiber 10 also comprises a coating surrounding the cladding. Such a coating may comprise several layers, and it may notably be a dual-layer coating, although these different layers are not shown on FIG. 1.

The different portions in the cladding may comprise pure silica glass ($SiO_2$), silica glass with one or more dopants, which increase the index of refraction (e.g. $GeO_2$ or any other known dopant), such as when the portion of the cladding is "up-doped", and/or silica glass with a dopant, which decreases the index of refraction, such as fluorine, such as when the portion of the cladding is "down-doped" (e.g. for the trench 12).

FIG. 2 illustrates a cross-section of the FMF optical fiber of FIG. 1. As already mentioned in relation to FIG. 1, the optical fiber 10 generally has a glass core 11 surrounded by a glass cladding. In the embodiment of FIG. 2, the glass core 11 has an elliptical outer circumference, with a semi-major axis of length a and a semi-minor axis of length b. The cladding directly abuts the core and has an outer radius $R_3$. The optical fiber also comprises a coating 60 of inner radius $R_3$ and outer radius $R_4$, whatever the number of layers in-between. In some embodiments described herein, the radius $R_4$ is about 125 μm (but it could be greater or less than 125 μm). In alternative embodiments, other dimensions could be such that $R_3$=40 μm or $R_3$=50 μm and $R_4$=62.5 μm.

The optical core 11 is directly surrounded by an optical cladding, which comprises at least a depressed-index ring 12, also called a trench, with inner radius $R_2$ and outer radius $R_{trench}$, and an outer cladding layer 50 with inner radius $R_{trench}$. In some embodiments, such an outer cladding layer 50 comprises pure silica glass ($SiO_2$) and its refractive index $n_{Cl}$ is hence that of silica glass or silica glass with one or more dopants. The trench 12 has a negative refractive index difference $\Delta n_t = n_{trench} - n_{Cl}$ with respect to the refractive index of the outer cladding, and its position and size are designed so as to improve bend-loss resistance of the fiber.

The cladding may also optionally include an inner cladding layer 30, directly surrounding the optical core, and with outer radius $R_2$. The trench 12 may hence be spaced apart from the core 11 by the inner cladding layer 30. Alternatively, the trench 12 may surround and directly contact the core portion 11.

Dotted lines $21_{eq}$ on FIG. 2 illustrate, within the optical core 11, circumferences of equal refractive index $n_{eq}$. In the exemplary embodiment of FIG. 2, such circumferences $21_{eq}$ are ellipses centered on the core center, but with different ovalities. Hence, the circumference closer to the core center is more circular than the two others. This corresponds to an embodiment of the FMF according to the present disclosure. However, according to another embodiment, the ovality of the core remains substantially the same throughout the core, and circumferences $21_{eq}$ would then be concentric ellipses of index i, with the same ovality $$o = \frac{a_i - b_i}{a_i + b_i}$$

where $a_i$ is the length of the semi-major axis of ellipse i, and $b_i$ is the length of the semi-minor axis of ellipse i. According to a further embodiment, the ovality of the core 11, trench 12 and optional inner cladding layer 30 are substantially the same. More precisely, the ovality of the fiber is not limited to the core 11, and the trench 12 and optional cladding layer 30 may also be elliptical, either with a constant or changing ovality.

FIG. 3 depicts the refractive index profile n(r) of a Few Mode optical fiber according to the prior art, which describes the relationship between the refractive index value n and the distance r from the center of the optical fiber. The x-axis represents radial position with x=0 representing the center of the core region, and the y-axis represents refractive index, expressed as an index difference $\Delta n$ ($\times 10^3$) unless otherwise stated.

Such a FMF has an optical core having a refractive index profile n(r) defined as follows:

$$n(r) = n_{co} \cdot \sqrt{1 - 2\Delta\left(\frac{r}{r_0}\right)^\alpha} \quad \text{for } r \leq r_0$$

where:
r is a variable representative of the radius of the optical fiber,
$r_0$ is the optical core radius,
$\Delta$ is the normalized refractive index difference, with $$\Delta = \frac{n_{co}^2 - n_{Cl}^2}{2n_{co}^2}$$

$n_{Cl}$ is the minimal refractive index of the optical core,
$n_{co}$ is the maximal refractive index of the optical core,
$\alpha$ is a non-dimensional parameter that defines the index profile shape of the optical core.

The alpha refractive index profile of the optical core allows reducing intermodal dispersion of the optical fiber.

The optical core is directly surrounded by an optical cladding, which comprises an inner cladding layer, a trench, and an outer cladding layer. The trench has a negative refractive index difference $\Delta n_t = n_{trench} - n_{Cl}$ with respect to the refractive index of the outer cladding, and its position and size are designed so as to improve bend-loss resistance of the fiber.

So far, FMFs have been designed to get the smallest Differential Mode Group Delays as possible, and have been operated in the weakly-coupled regime, in which the Group Delay Spread increases linearly with the propagation distance. In such FMFs, the coupling between propagating modes is low, mainly because of high effective index differences between the modes or the mode groups $\Delta n_{eff}$.

Actually, as may be observed in FIG. 3 for a standard 10-spatial-mode (namely 6 LP modes ($LP_{01}$, $LP_{11\ a,b}$, $LP_{02}$, $LP_{21\ a,b}$, $LP_{12\ a,b}$, $LP_{31\ a,b}$), divided into 4 mode-groups) fiber, the maximum effective index difference between any two subsequent mode groups is such that $\text{Max}|\Delta n_{eff\ c}| > 2.0 \times 10^{-3}$ at an operating wavelength $\lambda_{op}$=1550 nm. In this relation, the subscript c stands for circular, as the FMF of FIG. 3 shows a circularly symmetric core, with a radius $r_0$. The maximum Differential Mode Group Delay between any two LP modes, $\text{Max}|DMGD_c|$ is at 10 ps/km.

An embodiment of the present disclosure, illustrated by FIG. 4, consists in manufacturing FMFs with slightly elliptical cores, to reduce the effective index differences $\Delta n_{eff}$ between the propagating modes, thereby forcing mode coupling and imposing a square root behavior of the Group Delay Spread with the propagation distance.

Actually, the general form of the Group Delay Spread may be expressed as $$\text{Max}|DMGD| \times \sqrt{2} \times L_c \times \sqrt{\left(\exp\left(-\frac{L}{L_c}\right) + \frac{L}{L_c} - 1\right)},$$

where L is the propagation distance and $L_c$ is the coupling length. This formula can be directly derived, for N spatial modes, from the formula given for two polarization modes in the article by C. D. Poole "*Statistical treatment of polarization dispersion in single-mode fiber*", *Optics Letters*, p. 687 (1988). In the weakly-coupled regime, $L_c \gg L$ and, as a result, GDS~Max|DMGD|×L. In the strongly-coupled regime, $L_c \ll L$ and GDS~Max|DMGD|×$\sqrt{2 \times L_c \times L}$. Assuming that Max|DMGD| remains unchanged, the Group Delay Spread is thus reduced by a factor of ~$\sqrt{L/(2 \times L_c)}$ in the strongly-coupled regime, as compared to the weakly-coupled regime.

FIG. 4 thus shows the refractive index profile n(r) of the Few Mode optical fiber of FIG. 3 but with a core ovality defined by the core ovality criterion $$o = \frac{a-b}{a+b}$$

of value o=0.15. The core 11 of the FMF of FIG. 4 is now elliptical with a semi-major axis with a length $a=r_0(1+o)$ and a semi-minor axis with a length $b=r_0(1-o)$.

In FIG. 4, the refractive index profile in solid line corresponds to the average refractive index profile of the circular core optical fiber of FIG. 3. The refractive index profile of the elliptical core optical fiber is illustrated along the major axis x (shown in dashed line) and along the minor axis y (dotted line) of the ellipse: hence, the x-axis of FIG. 4 illustrates the radius of the optical core by axis, aka the distance to the core center along either axis.

As may be observed, the ovality of the core breaks the mode-group degeneracies and ten spatial modes with ten different effective indexes can now be distinguished, namely $LP_{01}$, $LP_{11a}$, $LP_{11b}$, $LP_{02}$, $LP_{21a}$, $LP_{21b}$, $LP_{12a}$, $LP_{12b}$, $LP_{31a}$ and $LP_{31b}$. Each of these ten spatial modes is illustrated by a horizontal dashed line indicating its associated effective index difference with the outer cladding. The resulting maximum effective index difference Max|$\Delta n_{eff\,o}$| between any two subsequent spatial modes propagating in the optical core 11, except $LP_{01}$, $LP_{11a}$ and $LP_{11b}$ spatial modes, is now Max|$\Delta n_{eff\,o}$|≤0.65×10$^{-3}$ at $\lambda_{op}$=1550 nm. The subscript o stands for ovality. The maximum Differential Mode Group Delay between any two LP modes, Max|DMGD$_o$| is at 20 ps/km.

Assuming the strongly-coupled regime is attained with a coupling length Lc=10 km in the elliptical case of FIG. 4, the Group Delay Spread thus reaches GDS$_o$~9 ns after 10,000 km, when GDS$_c$~100 ns in the weakly-coupled regime, corresponding to the circular case of FIG. 3. If the strongly-coupled regime is not attained in the elliptical case of FIG. 4, for example because the mixing between the $LP_{01}$ and $LP_{11}$ and between $LP_{11}$ and the other modes is not strong enough, then the Group Delay Spread GDS$_o$ will be slightly less reduced and will then meet the following inequality: 9 ns<GDS$_o \ll$100 ns.

In order to further reduce the Group Delay Spread GDS$_o$, an embodiment of the present disclosure consists in concatenating elliptical core fibers with positive and negative DMGDs for the $LP_{11}$ mode, to form an optical link as the one illustrated in FIG. 5.

The optical link 70 is built by concatenating several FMFs (for example such an optical link 70 comprises p spans of optical fibers, with p≥2, which are spliced together. FIG. 5 only shows FMF 70$_1$ and FMF 70$_p$, all the other potential FMFs i∈[[1;p]] in the optical link being symbolized by dashed lines). FMF 70$_1$ has a length $L_1$, FMF 70$_i$ has a length $L_i$ and FMF 70$_p$ has a length $L_p$. FMFs 70$_1$ to 70$_p$ are hence spliced together to form an optical link 70 of length $L=L_1+ \ldots +L_i+ \ldots +L_p$, which can be of several tens or several hundreds of kilometers. Of course, the present disclosure encompasses any number of FMFs concatenated to form an optical link; as a mere example, such a link may comprise only two FMFs, four FMFs, or even several tens of FMFs.

As described for example in patent document WO2015/040447, there are optimum values for α, for which Max|DMGD| have minimum values, and α lower and higher than these "optimum α" generally exhibit DMGDs with opposite signs.

As a consequence, it is possible to associate a FMF with an α-value either slightly higher or lower than the "optimum α" with another FMF showing an appropriate α (i.e. either higher than the "optimum α" if the off-target α is smaller, or smaller than the "optimum α" if the off-target α is higher, by choosing appropriate lengths for both FMFs, in order to realize a "DMGD-compensated" link.

This association can contribute to reducing the Group delay Spread GDS$_o$, in case the strong-mode coupling is not attained. The concatenation must focus on the three first spatial modes, namely $LP_{01}$, $LP_{11a}$ and $LP_{11b}$, and the value of α for the concatenated fibers must be chosen so as to minimize the DMGD for the $LP_{11}$ mode. It is thus possible to build an optical link with Max|DMGD$_{link}$|$_{LP_{11}}$≤50 ps/km.

FIG. 6 illustrates the refractive index profile n(r) of another Few Mode optical fiber according to the prior art, which describes the relationship between the refractive index value n and the distance r from the center of the optical fiber. The x-axis represents radial position with x=0 representing the center of the core region, and the y-axis represents refractive index, expressed as an index difference Δn (×10$^3$) unless otherwise stated.

The FMF optical fiber of FIG. 6 is similar to that of FIG. 3, in terms of structure, with a circular core with a radius $r_0$, but supports propagation of 15 spatial modes (namely nine LP modes ($LP_{01}$, $LP_{11a}$, $LP_{11b}$, $LP_{02}$, $LP_{21a}$, $LP_{21b}$, $LP_{12a}$, $LP_{12b}$, $LP_{31a}$, $LP_{31b}$, $LP_{03}$, $LP_{22a}$, $LP_{22b}$, $LP_{41a}$ and $LP_{41b}$) divided into five mode groups).

As may be observed in FIG. 6 for this standard 15-spatial-mode fiber, the maximum effective index difference between any two mode groups is such that Max|$\Delta n_{eff\,c}$|>2.5×10$^{-3}$ at an operating wavelength $\lambda_{op}$=1550 nm. In this relation, the subscript c stands for circular, as the FMF fiber of FIG. 6 shows a circularly symmetric core, with a radius $r_0$. The maximum Differential Mode Group Delay between any two LP modes, Max|DMGD$_c$| is at 150 ps/km.

FIG. 7 illustrates the refractive index profile n(r) of the Few Mode optical fiber of FIG. 6 but with a core ovality defined by the core ovality criterion $$o = \frac{a-b}{a+b}$$

of value o=0.15. The core 11 of the FMF of FIG. 7 is now elliptical with a semi-major axis with a length $a=r_0(1+o)$ and a semi-minor axis with a length $b=r_0(1-o)$.

In FIG. 7, the refractive index profile in solid line corresponds to the average refractive index profile of the circular core optical fiber of FIG. 6. The refractive index profile of the elliptical core optical fiber is illustrated along the major axis x (shown in dashed line) and along the minor axis y (dotted line) of the ellipse: hence, the x-axis of FIG. 7 illustrates the radius of the optical core by axis, aka the distance to the core center along either axis.

As may be observed, like in FIG. 4, the ovality of the core breaks the mode-group degeneracies and fifteen spatial modes with fifteen different effective indexes can now be distinguished, namely $LP_{01}$, $LP_{11a}$, $LP_{11b}$, $LP_{02}$, $LP_{21a}$, $LP_{21b}$, $LP_{12a}$, $LP_{12b}$, $LP_{31a}$, $LP_{31b}$, $LP_{03}$, $LP_{22a}$, $LP_{22b}$, $LP_{41a}$ and $LP_{41b}$. Each of these fifteen spatial modes is illustrated by a horizontal dashed line indicating its associated effective index difference with the outer cladding. The resulting maximum effective index difference $Max|\Delta n_{eff\ o}|$ between any two subsequent spatial modes propagating in the optical core 11, excluding $LP_{01}$, $LP_{11a}$ and $LP_{11b}$ spatial modes, is now $Max|\Delta n_{eff\ o}| \leq 0.8 \times 10^{-3}$ at $\lambda_{op}=1550$ nm. The subscript o stands for ovality. The maximum Differential Mode Group Delay between any two LP modes, $Max|DMGD_o|$ is at 200 ps/km.

Assuming the strongly-coupled regime is attained with a coupling length Lc=10 km in the elliptical case of FIG. 7, the Group Delay Spread thus reaches $GDS_o \sim 90$ ns after 10,000 km, when $GDS_c \sim 1.5$ µs in the weakly-coupled regime, corresponding to the circular case of FIG. 6. If the strongly-coupled regime is not attained in the elliptical case of FIG. 7, for example because the mixing between the $LP_{01}$ and $LP_{11}$ and between $LP_{11}$ and the other modes is not strong enough, then the Group Delay Spread $GDS_o$ will be slightly less reduced and will then meet the following inequality: 90 ns<$GDS_o$<<1.5 µs.

As described previously in relation to FIG. 5, the Group Delay Spread $GDS_o$ may be further reduced by concatenating Few Mode Fibers satisfying an ovality criterion between 0.05 and 0.30 and showing opposite signs of the DMGD for the $LP_{11}$ mode.

According to embodiments of the present disclosure, like the ones illustrated in FIGS. 4 and 7, such FMFs support 6 to 55 spatial modes. The wavelength of operation, $\lambda_{op}$, is preferably in the C-(1530-1570 nm) or L-(1570-1625 nm) bands but it can be chosen between 1460 and 1675 nm.

These FMFs have core ovalities, measured by a value of the ovality criterion o, between 0.05 and 0.30, where o=(a−b)/(a+b) where a is the length of the semi-major axis and b is the length of the semi-minor axis of the elliptical core. Such an ovality criterion is measured at an index lower than the core maximum refractive index, namely on a circumference of equal refractive index $n_{eq}$ such that $\Delta n_{eq}=n_{eq}-n_{Cl}$ is less than 75% of $\Delta n_{co}=n_{co}-n_{Cl}$.

They may also show a changing ovality profile, with a value of the ovality criterion increasing from the region of the core center to reach an optimum value between 0.10 and 0.30, and then decreasing towards the core-cladding interface where the value of the ovality criterion may be lower than 0.05.

An example of such a changing ovality profile is illustrated by FIG. 8, which shows a cross-section view of a FMF according to an embodiment of the present disclosure. More precisely, the core 11 of the FMF of FIG. 8 has a constant ovality of 0.05 from the core center to a distance of 8 µm along the major axis (or x-axis in FIG. 8). The ovality then increases to 0.15 from 8 µm to 12 µm along the major axis, and decreases again from 0.15 to 0.05 from 12 µm to 17.2 µm, corresponding to the end of the trench 12. Hence, the ovality is not limited to the core of the fiber, but also encompasses the trench 12 and the inner cladding layer 30.

The core ovality can be obtained during deposition (fabrication of the preform by OVD ("Outside Vapor Deposition"), VAD ("Vapor Axial Deposition"), MCVD ("Modified Chemical Vapor Deposition") or PCVD ("Plasma Chemical Vapor Deposition") by increasing the temperature and/or by changing the rotation of the preform. It can also be obtained during the consolidation or collapsing phases, and/or during over-cladding by any possible means that can break the circular symmetry of the core.

During drawing, the fiber is preferably spun with few turns per meter to induce a chirality of at least 1 turn/meter, which can also further enhance coupling between the degenerate spatial modes of the FMFs with slightly elliptical cores.

FIGS. 9A and 9B illustrate embodiments of an optical system according to the present disclosure. According to the first embodiment in FIG. 9A, such an optical system comprises transceivers 81 and receivers 85 optically connected by an optical fiber link 70 that includes at least two spans of fiber. Transceivers 81 comprise light sources (such as lasers) and generate n LP modes, referenced 1, 2, . . . , n used in the optical system of FIG. 9A. A mode multiplexer 82 multiplexes the n LP modes and is optically connected to optical link 70, which guides the n multiplexed LP modes, towards a mode demultiplexer 83, which is optically connected to the end of optical link 70.

Mode demultiplexer 83 demultiplexes the n multiplexed LP modes, and feeds each LP mode into an amplifier 84. At the output of amplifiers 84, LP modes enter receivers 85.

Such an optical system may comprise M optical links. In an example, M=1; in another example, M=2; in another example M=5; in yet another example, M=10. In case the optical system comprises M optical links, it also comprises M mode multiplexers 82, M mode demultiplexers 83, and M amplifiers 84 for each LP mode guided by the optical system.

The embodiment in FIG. 9B differs from the first embodiment in FIG. 9A in that amplifier 84 amplifies all LP modes guided by the optical link 70; as such, amplifier 84 is optically connected between the output of optical link 70 and the input of mode demultiplexer 83. In this second embodiment, when the optical system comprises M optical links, it also comprises M amplifiers 84; however, there is only one mode multiplexer 82, optically connected between transceivers 81 an optical link 70, and only one mode demultiplexer 83, optically connected between amplifier 84 and receivers 85.

The embodiments of FIGS. 9A and 9B are given as mere examples, and an optical link according to the invention may of course be used in any other kind of optical system.

The invention claimed is:

1. An optical fiber comprising an optical core and an optical cladding surrounding the optical core, the optical core having an α graded-index profile with α>1, α being a non-dimensional parameter that defines the index profile shape of the optical core, and the optical core having a maximal refractive index $n_{co}$ at its center, said optical cladding having at its outer edge a refractive index $n_{Cl}$, said optical cladding comprising a region of depressed refractive index $n_{trench}$, called a trench, with a negative refractive index difference $\Delta n_t = n_{trench} - n_{Cl}$ with respect to said optical cladding, said trench having an outer radius $R_{trench}$, wherein said optical core and said optical cladding are configured to support propagation of at least six spatial modes and at maximum fifty-five spatial modes at an operating wavelength $\lambda_{op}$ between, and including, 1460 nm and 1675 nm, and wherein said optical core satisfies an ovality criterion between 0.05 and 0.30, when said ovality criterion is measured at a circumference of equal index $n_{eq}$ within said core, such that $\Delta n_{eq}=n_{eq}-n_{Cl}$ is less than 75% of $\Delta n_{co}=n_{co}-n_{Cl}$, said ovality criterion o being defined by the following equation:

$$o = \frac{a-b}{a+b}$$

where a is a length of a semi-major axis of said circumference and b is a length of a semi-minor axis of said circumference, and wherein a maximum $Max|\Delta n_{\mathit{eff}\,o}|$ of effective index differences between any two subsequent spatial modes propagating in said optical core, except $LP_{01}$, $LP_{11a}$ and $LP_{11b}$ spatial modes, is such that $Max|\Delta n_{\mathit{eff}\,o}| \leq 1.0 \times 10^{-3}$.

2. The optical fiber according to claim 1, wherein said ovality criterion of said optical core varies as a function of a distance to the optical core center.

3. The optical fiber according to claim 2, wherein said ovality criterion of said optical core increases from a first low ovality value measured at a circumference of equal index $n'_{eq}$ within said core, such that $\Delta n'_{eq}=n'_{eq}-n_{Cl}$ is more than 75% of $\Delta n_{co}=n_{co}-n_{Cl}$, to an optimum ovality value measured at said circumference of equal index—$n_{eq}$ within said core, such that $\Delta n_{eq}=n_{eq}-n_{Cl}$ is less than 75% of $\Delta n_{co}=n_{co}-n_{Cl}$, and wherein said ovality criterion of said optical core decreases from said optimum ovality value to a second low ovality value measured at a core-cladding interface.

4. The optical fiber according to claim 3, wherein said optimum ovality value is between 0.10 and 0.30.

5. The optical fiber according to claim 3, wherein said first and second low ovality values are less than circa 0.05.

6. The optical fiber according to claim 1, wherein said optical core and said optical cladding are configured such that:

a length a of a semi-major axis of an outer circumference of said optical core is between 13.5 μm and 27 μm;

said trench outer radius $R_{trench}$ is between 20 μm and 42 μm;

said trench negative refractive index difference $\Delta n_t = n_{trench} - n_{Cl}$ is between $-15 \times 10^{-3}$ and $-5 \times 10^{-3}$ at said operating wavelength $\lambda_{op}$; and $$7.8 \leq \frac{2 \cdot \pi \cdot a}{\lambda_{op}} \sqrt{n_{co}^2 - n_{cl}^2} \leq 23.$$

7. The optical fiber according to claim 1, wherein said non-dimensional parameter α has a value between 1 and 3.

8. The optical fiber according to claim 1, wherein a maximum $Max|\Delta n_{\mathit{eff}\,o}|$ of effective index differences between any two subsequent spatial modes propagating in said optical core, except $LP_{01}$, $LP_{11a}$ and $LP_{11b}$ spatial modes, is such that $Max|\Delta n_{\mathit{eff}\,o}| \leq 0.8 \times 10^{-3}$.

9. The optical fiber according to claim 1, wherein a maximum $Max|\Delta n_{\mathit{eff}\,o}|$ of effective index differences between any two subsequent spatial modes propagating in said optical core, except $LP_{01}$, $LP_{11a}$ and $LP_{11b}$ spatial modes, is such that $$Max|\Delta n_{\mathit{eff}\,o}| \leq 2 \cdot \frac{\sqrt{2\Delta}}{\tau_o \times k \times (M+1)},$$

where:

$$\Delta = \frac{n_{co}^2 - n_{Cl}^2}{2n_{co}^2}$$

is a normalized core cladding refractive index difference, $$k = \frac{2\pi}{\lambda_{op}},$$

and

M is a number of mode groups which propagate in said optical core, said optical core is circular with an outer radius $r_0$, such that $a = r_0(1+o)$ and $b = r_0(1-o)$, does not satisfy any non-zero ovality criterion.

10. The optical fiber according to claim 1, wherein a maximum $Max|\Delta n_{\mathit{eff}\,o}|$ of effective index differences between any two subsequent spatial modes propagating in said optical core, except $LP_{01}$, $LP_{11a}$ and $LP_{11b}$ spatial modes, is such that $$Max|\Delta n_{\mathit{eff}\,o}| < 2 \cdot \frac{Max|\Delta n_{\mathit{eff}\,c}|}{(M+1)},$$

where $Max|\Delta n_{\mathit{eff}\,c}|$ is a maximum of effective index differences between any two subsequent spatial modes which would propagate in said optical core said optical core is circular with an outer radius $r_0$, such that $a = r_0(1+o)$ and $b = r_0(1-o)$, and does not satisfy any non-zero ovality criterion.

11. The optical fiber according to claim 1, the optical fiber comprising a chirality of at least 1 turn/meter.

12. The optical link comprising N optical fibers according to claim 1, with $N \geq 2$, N being an integer, wherein at least two optical fibers in said link have $DMGD_i$ showing opposite signs for at least the $LP_{11}$ mode guided by said optical fibers, where $DMGD_i$ is a Differential Mode Group Delay between said $LP_{11}$ mode and any other guided mode in optical fiber i.

13. The optical link according to claim 12, wherein $Max|DMGD_{link}|_{LP_{11}} \leq 50$ ps/km, where $Max|DMGD_{link}|_{LP_{11}}$ is an absolute maximum value of Differential Mode Group Delay between said $LP_{11}$ mode and any other guided mode in said optical link.

14. An optical system comprising at least one optical fiber according to claim 1.

15. An optical system comprising an optical link according to claim 12.

* * * * *